(12) United States Patent
Yuhas et al.

(10) Patent No.: US 9,751,772 B2
(45) Date of Patent: *Sep. 5, 2017

(54) ALUMINOPHOSPHATE MOLECULAR SIEVES USING AN ORGANO-1-OXA-4-AZONIUMCYCLOHEXANE COMPOUND

(71) Applicant: UOP LLC, Des Plaines, IL (US)

(72) Inventors: Benjamin D. Yuhas, Evanston, IL (US); Christopher P. Nicholas, Evanston, IL (US); Mark A. Miller, Niles, IL (US); Melissa M. Galey, Chicago, IL (US)

(73) Assignee: UOP LLC, Des Plaines, IL (US)

( * ) Notice: Subject to any disclaimer, the term of this patent is extended or adjusted under 35 U.S.C. 154(b) by 425 days.

This patent is subject to a terminal disclaimer.

(21) Appl. No.: 14/561,121

(22) Filed: Dec. 4, 2014

(65) Prior Publication Data

US 2016/0159656 A1  Jun. 9, 2016

(51) Int. Cl.
| | | |
|---|---|---|
| *C01B 39/54* | (2006.01) | |
| *B01J 29/83* | (2006.01) | |
| *B01J 29/84* | (2006.01) | |
| *B01J 37/00* | (2006.01) | |
| *B01J 37/10* | (2006.01) | |
| *B01J 29/85* | (2006.01) | |

(52) U.S. Cl.
CPC ............. *C01B 39/54* (2013.01); *B01J 29/83* (2013.01); *B01J 29/84* (2013.01); *B01J 37/0018* (2013.01); *B01J 37/10* (2013.01); *B01J 29/85* (2013.01)

(58) Field of Classification Search
CPC .. C01B 39/54; B01J 29/83; B01J 29/85; B01J 35/023; B01J 37/0018; B01J 37/10; B01J 2229/42; B01J 29/84

See application file for complete search history.

(56) References Cited

U.S. PATENT DOCUMENTS

| | | |
|---|---|---|
| 4,061,717 A | 12/1977 | Kerr et al. |
| 4,310,440 A | 1/1982 | Wilson et al. |
| 4,440,871 A | 4/1984 | Lok et al. |
| 4,567,029 A | 1/1986 | Wilson et al. |

(Continued)

FOREIGN PATENT DOCUMENTS

| | | |
|---|---|---|
| JP | 2005222975 A | 8/2005 |
| NO | 2011075224 A1 | 6/2011 |

(Continued)

OTHER PUBLICATIONS

International Search Report dated May 19, 2016 in International Application No. PCT/US2015/062906.

(Continued)

*Primary Examiner* — David M Brunsman

(57) ABSTRACT

A method for synthesizing an aluminophosphate based molecular sieve is described. The method may include the steps of: (a) preparing an aqueous mixture comprising water, a substituted hydrocarbon, and a 1-oxa-4-azacyclohexane derivative; (b) reacting the aqueous mixture; (c) obtaining a solution comprising an organo-1-oxa-4-azoniumcyclohexane compound; (d) forming a reaction mixture comprising reactive sources of Al, and P, and the solution; and (e) heating the reaction mixture to form the molecular sieve.

20 Claims, 5 Drawing Sheets

(56) References Cited

U.S. PATENT DOCUMENTS

| | | | |
|---|---|---|---|
| 4,973,781 A | 11/1990 | Valyocsik et al. | |
| 4,973,785 A | 11/1990 | Lok et al. | |
| 5,972,203 A | 10/1999 | Smith et al. | |
| 7,449,169 B2 | 11/2008 | Corma Canos et al. | |
| 7,648,694 B2 | 1/2010 | Burton, Jr. | |
| 7,820,141 B2 | 10/2010 | Burton, Jr. | |
| 8,075,871 B2 | 12/2011 | Burton, Jr. et al. | |
| 8,470,293 B2 * | 6/2013 | Mertens | B01J 29/85 423/305 |
| 9,415,381 B2 * | 8/2016 | Burton | B01J 29/70 |

FOREIGN PATENT DOCUMENTS

| | | |
|---|---|---|
| WO | WO 2010/059297 A2 | 5/2010 |
| WO | WO 2010/065319 A2 | 6/2010 |
| WO | WO 2010/099441 A2 | 9/2010 |
| WO | WO 2013/019462 A1 | 2/2013 |
| WO | WO 2013/028303 A1 | 2/2013 |

OTHER PUBLICATIONS

Marchese L. et al. ALPO-34 and SAPO-34 synthesized by using morpholine as templating agent. FTIR and FT-Raman studies of the host-guest and guest-guest interactions within the zeolitic framework. Microporous and Mesoporous Materials 1999, 30, pp. 145-153, pp. 146-148.

Sasidharan et al., "Designing the synthesis of catalytically active Ti-B using various new templates . . . ," Physical Chemistry Chemical Physics (2011), 13(36), 16282-16294.

Maple et al., "Synthesis and characterization of aluminophosphate-based zeotype materials . . . " Dalton Transactions (2007), vol. 37, 4175-4181.

Corma et al., "A zeolite with interconnected 8-, 10- and 12-ring pores and its unique catalytic selectivity," Nature Materials (2003), 2(7), 493-497.

Thomas, J., "Quaternary Ammonium Compounds . . . " Journal of Medicinal and Pharmaceutical Chemistry (1961), 3(1), 45-51.

Aitken et al., "A synthetic and NMR conformational study of spiro cyclic quaternary ammonium salts," ARKIVOC (2002), vol. iii, 63-70.

Libman et al., "Some Bisquaternary Salts," Journal of the Chemical Society (1952), 2305-2307.

Zhang et al., "Synthesis of Self-Pillared Zeolite Nanosheets by Repetitive Branching," Science (2012), vol. 336, 1684-1687.

Schreyeck et al., "The diaza-polyoxa-macrocycle 'Kryptofix222' as a new template . . . " Microporous and Mesoporous Materials (1998), 22, 87-106.

* cited by examiner

ALUMINOPHOSPHATE MOLECULAR SIEVES USING AN ORGANO-1-OXA-4-AZONIUMCYCLOHEXANE COMPOUND

BACKGROUND OF THE INVENTION

1. Field of the Invention

This invention relates to novel organo-1-oxa-4-azonium cyclohexane compounds, a process for preparing the quaternary ammonium salts, and the use of the quaternary ammonium salts in the synthesis of aluminophosphate or silicoaluminophosphate molecular sieves.

2. Description of the Related Art

Classes of molecular sieves include crystalline aluminophosphate, silicoaluminophosphate, or metalloaluminophosphate compositions which are microporous and which are formed from corner sharing $AlO_{4/2}$ and $PO_{4/2}$ tetrahedra. In 1982, Wilson et. al. first reported aluminophosphate molecular sieves, the so-called AlPOs, which are microporous materials that have many of the same properties as zeolites, although they are silica free (See U.S. Pat. No. 4,310,440). Subsequently, charge was introduced to the neutral aluminophosphate frameworks via the substitution of $SiO_{4/2}$ tetrahedra for $PO_{4/2}^+$ tetrahedra to produce the SAPO molecular sieves as described by Lok, et. al. (See U.S. Pat. No. 4,440,871). Another way to introduce framework charge to neutral aluminophosphates is to substitute $[Me^{2+}O_{4/2}]^{2-}$ tetrahedra for $AlO_{4/2}^-$ tetrahedra, which yield the MeAPO molecular sieves (see U.S. Pat. No. 4,567,029). It is furthermore possible to introduce framework charge on AlPO-based molecular sieves via the simultaneous introduction of $SiO_{4/2}$ and $[M^{2+}O_{4/2}]^{2-}$ tetrahedra to the framework, giving MeAPSO molecular sieves (See U.S. Pat. No. 4,973,785).

Numerous molecular sieves, both naturally occurring and synthetically prepared, are used in various industrial processes. Synthetically, these molecular sieves are prepared via hydrothermal synthesis employing suitable sources of Si, Al, P, and structure directing agents such as amines or organoammonium cations. The structure directing agents reside in the pores of the molecular sieve and are largely responsible for the particular structure that is ultimately formed. These species may balance the framework charge associated with silicon or other metals such as Zn in the aluminophosphate compositions and can also serve as space fillers to stabilize the tetrahedral network framework. Molecular sieves are characterized by having pore openings of uniform dimensions, having a significant ion exchange capacity, and being capable of reversibly desorbing an adsorbed phase which is dispersed throughout the internal voids of the crystal without significantly displacing any atoms which make up the permanent molecular sieve crystal structure. Molecular sieves can be used as catalysts for hydrocarbon conversion reactions, which can take place on outside surfaces as well as on internal surfaces within the pore.

Synthesis of molecular sieve materials often relies on the use of organoamino or organoammonium templates known as organic structure directing agents (OSDAs). While simple OSDAs such as tetramethylammonium, tetraethylammonium and tetrapropylammonium are commercially available, often, OSDAs are complicated molecules that are difficult and expensive to synthesize; however, their importance lies in their ability to impart aspects of their structural features to the molecular sieve to yield a desirable pore structure. For example, the use of 1,4,7,10,13,16-hexamethyl-1,4,7,10,13,16-hexaazacyclooctadecane as OSDA has been shown to allow synthesis of STA-7, an aluminophosphate based material of the SAV zeotype (Wright, et. al. *J. Chem. Soc., Dalton Trans.*, 2000, 1243-1248); the use of 4,7,13,16,21,24-hexaoxa-1,10-diazabicyclo[8.8.8]hexacosane ('Kryptofix 222') led to the synthesis of $AlPO_4$-42 (Schreyeck, et. al. *Micro. Meso. Mater.* 1998, 22, 87-106); MAP 0-35, a magnesium aluminophosphate material with the LEV topology, is disclosed in U.S. Pat. No. 4,567,029 in which quinuclidine is employed as a structure directing agent; and in U.S. Pat. No. 4,973,785, the MeAPSO composition CoAPSO-35 is disclosed, which contains both cobalt and silicon in the framework in addition to Al and P and uses methylquinuclidine as the structure directing agent.

The art clearly shows that use of complex organoammonium SDAs often results in new molecular sieve materials. However, the synthesis of these complicated organoammonium compounds is quite lengthy and requires many steps, often in an organic solvent, thereby hindering development of the new molecular sieve material. Frequently, even for simple, commercially available OSDAs, the OSDA is the most costly ingredient used in synthesizing molecular sieve materials. Consequently, it would be economically advantageous to synthesize new molecular sieves from either commercially available organoammonium SDAs or SDAs which may be readily synthesized from commercially available starting materials.

The simple, commercially available, amine morpholine (tetrahydro-1,4-oxazine) has been previously utilized in aluminophosphate based molecular sieve synthesis and has been shown to yield CHA-type molecular sieves (Marchese, et. al. *Micro. Meso. Mater.* 1999, 30, 145-53; Ito, et. al. *Acta Cryst.* 1985, C41, 1698-1700), but has not yet been shown to yield other structure type molecular sieves. Additionally, the vapor pressure of morpholine is relatively high, making its use on commercial scale troublesome as low vapor pressure organoammonium SDAs are preferred.

The complicated OSDA(s) discussed previously were synthesized ex-situ and added to the reaction mixture at several points. However, one drawback of ex-situ synthesis is the process is typically carried out in the presence of an organic solvent, which necessitates at least one undesirable purification step to recover the SDA from the unwanted organic material.

Therefore, what is needed in the art are novel organo-1-oxa-4-azonium cyclohexane compounds. It would be desirable for these organo-1-oxa-4-azonium cyclohexane compounds to be useful as SDAs for aluminosilicate, silicate, aluminophosphate, or silicoaluminophosphate compositions.

SUMMARY OF THE INVENTION

The present invention discloses a process for preparing a pre-reacted aqueous solution of substituted hydrocarbons and amines essentially incapable of undergoing pyramidal inversion, which overcomes the aforementioned difficulties. The inventors have made the surprising discovery that a substituted hydrocarbon and amine may be reacted in an aqueous solution at (or slightly above) room temperature to yield an aqueous solution comprising the OSDA. This process is disclosed for a broad class of amines in U.S. application Ser. No. 14/552,654, hereinby incorporated by reference. This solution may then be used without purification in the synthesis of molecular sieves. This procedure thereby allows the preparation of SDAs, such as unusual quaternary ammonium salts, from readily available starting reagents in a facile and practical manner.

OSDAs prepared by the methods of the present invention are in aqueous solution and do not pose odor and flashpoint concerns. The result is the unprecedented ability to remove the cooling step typically required in the preparation of in-situ zeolite reaction mixtures and to avoid purification steps such as evaporation of organic solvent typically required in ex-situ preparation methods.

One aspect of the invention are novel morpholinium compounds comprising 1-oxa-4-azonium cyclohexane salts. In one version, the 1-oxa-4-azonium cyclohexane salts have the structure of Formula 1:

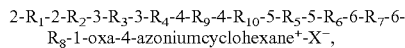

wherein $R_1$-$R_8$ are independently selected from H or an alkyl group having the formula $C_nH_{2n+1}$ where n is in the range from 1 to 4; $R_9$ and $R_{10}$ form a cyclic alkyl group having the formula $C_mH_{2m}$ forming a heterocycle of ring size q, where m is in the range from 4 to 8, and q is in the range of 5 to m+1; X is a halide or hydroxide; and the total number of C atoms in the molecule is in a range of 8 to 17.

Another version of the 1-oxa-4-azonium cyclohexane salts have the structure of Formula 2:

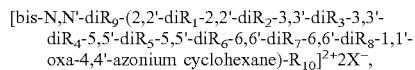

wherein $R_1$-$R_9$ are independently selected from H or an alkyl group having the formula $C_nH_{2n+1}$, where n is in the range from 1 to 4, X is halide or hydroxide, the total number of C atoms in the molecule is in the range of 11 to 24, and $R_{10}$ is an alkyl group having the formula $C_mH_{2m}$, where m is in the range from 3 to 8 and is connected to the 4 and 4' N atoms at positions x and y of the alkyl chain where x and y are independently selected from 1 to m.

Yet another version of the 1-oxa-4-azonium cyclohexane salts have the structure of Formula 3:

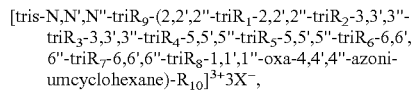

wherein $R_1$-$R_9$ are independently selected from H or an alkyl group having the formula $C_nH_{2n+1}$, where n is in the range from 1 to 4, X is halide or hydroxide, the total number of C atoms in the molecule is the range of 15 to 36, and $R_{10}$ is an alkyl group having the formula $C_mH_{2m-1}$, where m is in the range from 3 to 8 and is connected to the 4, 4' and 4" N atoms at positions x, y and z of the alkyl chain where x, y and z are independently selected from 1 to m.

Still another version of the 1-oxa-4-azonium cyclohexane salts have the structure of Formula 4:

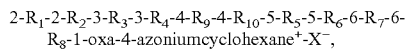

wherein $R_1$-$R_9$ are independently selected from H or an alkyl group having the formula $C_nH_{2n+1}$ where n is in the range from 1 to 4, $R_{10}$ is selected from an alkyl group having the formula $C_nH_{2n+1}$ where n is in the range from 1 to 4, benzyl, 1-methylnaphthalene, 2-methylnaphthalene and a non-olefinic alkyl group having the formula $C_pH_{2p-1}$ where p is in the range from 4 to 10, X is halide or hydroxide, and the total number of C atoms in the molecule is in the range of 4 to 16.

In another version of the method, the organo-1-oxa-4-azoniumcyclohexane compound is a structure directing agent in the synthesis of zeolites, aluminophosphates, or silicoaluminophosphates.

In another aspect, the invention provides a method for synthesizing a 1-oxa-4-azonium cyclohexane compound. The method includes the steps of: (a) preparing an aqueous mixture comprising water, a substituted hydrocarbon and a 1-oxa-4-azacyclohexane derivative; (b) reacting the aqueous mixture; and (c) obtaining a solution comprising the organo-1-oxa-4-azoniumcyclohexane compound, wherein the mixture and the solution are essentially free of aluminum and silicon. In one version of the method, the solution is essentially free of aluminum, silicon and phosphorous. In one version of the method, the solution is essentially free of aluminum and phosphorous. Essentially free of is meant to indicate that the element described was not intentionally added to the mixture or solution. Adventitious amounts of the element may be permitted, whether coming from dissolution of reactor walls, impurities in the starting materials or other causes. Essentially free of may signify that less than 1 wt % or less than 0.5 wt % or less than 0.1 wt % of the element is present.

In one version of the method, the step of reacting the aqueous mixture occurs at a temperature from about 0° C. to about 125° C., and for a time from about 15 min to about 72 hours. In another version of the method, the organo-1-oxa-4-azoniumcyclohexane product is used as a structure directing agent in the synthesis of a molecular sieve. In another version of the method, the 1-oxa-4-azacyclohexane derivative is essentially incapable of undergoing pyramidal inversion.

It is therefore an advantage of the present invention to provide a system and method for preparing structure directing agents in an aqueous mixture wherein the structure directing agents are prepared in the absence of P and Al reactive sources. Furthermore, the aqueous mixture is capable of forming an organo-1-oxa-4-azoniumcyclohexane halogen salt such as a bromide salt, in order to ultimately provide a solution including a quaternary organoammonium compound. The organoammonium bromide salt can be ion-exchanged, either by reaction with $Ag_2O$ or by anion exchange resins to yield the hydroxide form of the organo-1-oxa-4-azoniumcyclohexane compound or used as the halogen salt directly. Finally, the resultant organoammonium compound can be used for the synthesis of a zeolite or molecular sieve.

In one version of the process, an organic solvent is not used in obtaining the structure directing agent.

In one version, the invention provides a method for synthesizing an aluminophosphate based molecular sieve. The method may include the steps of: (a) preparing an aqueous mixture comprising water, a substituted hydrocarbon, and a 1-oxa-4-azacyclohexane derivative; (b) reacting the aqueous mixture; (c) obtaining a solution comprising an organo-1-oxa-4-azoniumcyclohexane compound; (d) forming a reaction mixture comprising reactive sources of Al, and P, and the solution; and (e) heating the reaction mixture to form the molecular sieve.

In another version of the method, step (d) comprises forming a first mixture of the reactive sources of Me, Al, Si, P and the optional seeds of a molecular sieve, and adding the solution to the first mixture without cooling the first mixture.

In one version of the method, the step of reacting the aqueous mixture occurs at a temperature from about 0° C. to about 125° C., and for a time from about 15 min to about 72 hours.

In another aspect, the invention provides an aluminophosphate molecular sieve prepared by a process comprising the steps of: (a) preparing an aqueous mixture comprising water, a substituted hydrocarbon, and a 1-oxa-4-azacyclohexane derivative; (b) reacting the aqueous mixture; (c) obtaining a solution comprising an organo-1-oxa-4-azoniumcyclohexane compound; (d) forming a reaction mixture comprising reactive sources of Al and P, and the solution; and (e) heating the reaction mixture to form the molecular sieve.

In one version of the method, the aqueous mixture and the solution are essentially free of aluminum and phosphorous.

In another version of the method, the 1-oxa-4-azacyclohexane derivative is essentially incapable of undergoing pyramidal inversion.

These and other features, aspects, and advantages of the present invention will become better understood upon consideration of the following detailed description, drawings and appended claims.

DETAILED DESCRIPTION OF THE INVENTION

1. Preparation of Structure Directing Agents

The present invention deals with an aqueous process for preparing novel 1-oxa-4-azonium cyclohexane salts. These compounds can be used as an organic structure directing agent (OSDA), and they overcome many of the typical problems associated with OSDA synthesis and subsequent molecular sieve synthesis. Embodiments of the present invention cover methods for synthesis of the 1-oxa-4-azonium cyclohexane salts from a variety of starting materials.

Figure 1:
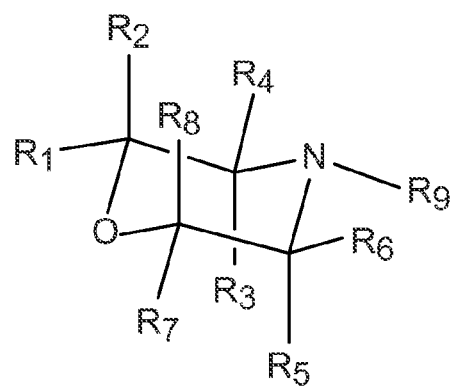
FIG. 1 is an illustration of the 1-oxa-4-azacyclohexane derivative.
Figure 2:
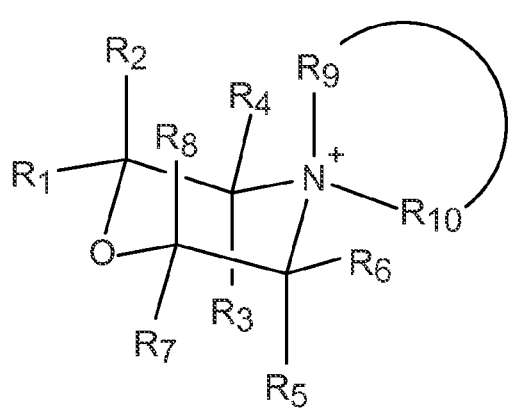
FIG. 2 is an illustration of the class of 1-oxa-4-azonium cyclohexane salts having the structure of Formula 1.
Figure 3:
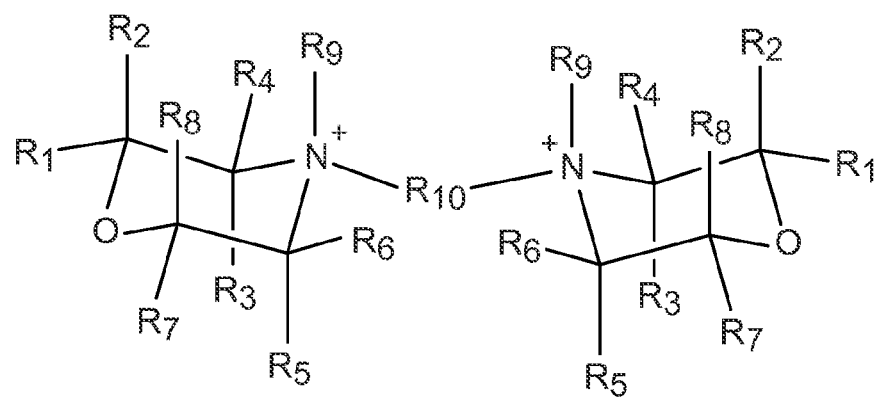
FIG. 3 is an illustration of the class of 1-oxa-4-azonium cyclohexane salts having the structure of Formula 2.
Figure 4:
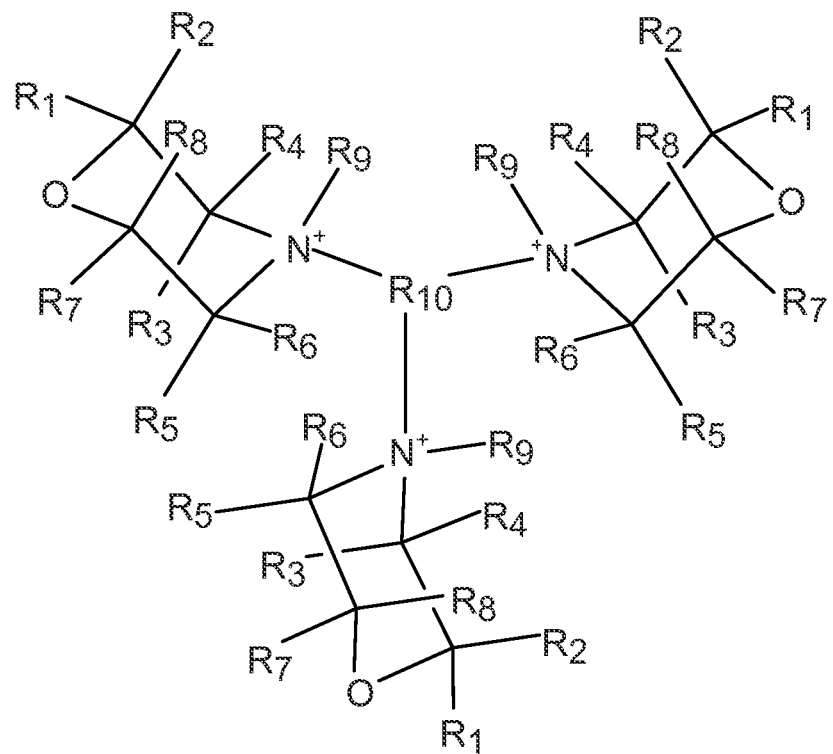
FIG. 4 is an illustration of the class of 1-oxa-4-azonium cyclohexane salts having the structure of Formula 3.
Figure 5:
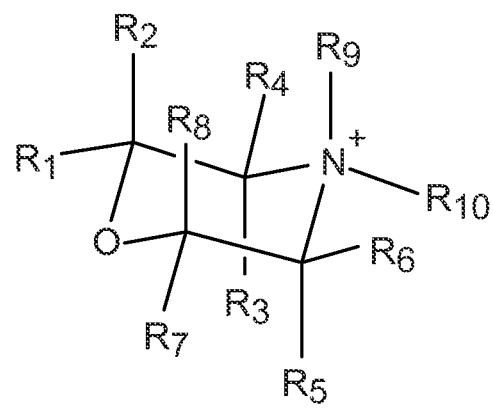
FIG. 5 is an illustration of the class of 1-oxa-4-azonium cyclohexane salts having the structure of Formula 4.

In a typical method for preparing the 1-oxa-4-azonium cyclohexane salts of the present invention, a substituted hydrocarbon is added to water to form a mixture. The 1-oxa-4-azacyclohexane derivative, as shown in FIG. 1, may then be added and the reaction mixture stirred until a solution containing the 1-oxa-4-azonium cyclohexane salt is observed. If the solution is cooled to room temperature, the product is stably maintained as an aqueous solution for later use.

In certain embodiments, the precursor reagents (e.g., the substituted alkane and 1-oxa-4-azacyclohexane derivative) may be added separately or together to form the reaction mixture at a number of points in the process. The precursors may be reacted together at temperatures ranging from about 0° C. to about 125° C. Preferably the precursors are reacted at about room temperature or at a slightly elevated temperature such as temperatures ranging from about 5° C. to about 100° C. More preferably, the precursors are reacted at temperatures from about 20° C. to about 120° C., or about 20° C. to about 80° C.

The reaction time varies from about 5 minutes to about 72 hr or from about 15 minutes to about 48 hr or from about 0.5 hr to about 48 hr.

The resulting solution may be cooled to room temperature or used as is. Other known techniques require the use of purification steps such as distillation, crystallization, chromatography and removal of a component via vacuum. A benefit of the instant method is that the solution of the organo-1-oxa-4-azoniumcyclohexane salt is prepared without additional purification steps occurring prior to use of the solution to make zeolites and molecular sieves. Some small laboratory scale procedures may involve removal of unreacted reactants; however, in commercial embodiments, it is most likely to react to completion. Ion-exchange as described below does not purify the solution, but converts halide anions to hydroxide ions and thus is not a purification step. The resulting solution may be cooled to room temperature or used as is. However, no purification steps occur prior to use of the solution.

The methods of the present invention may be carried out in preparation of microporous crystalline molecular sieves. In one aspect, the invention provides a method for synthesizing a molecular sieve. The method may include the steps of: (a) preparing an aqueous mixture comprising water, a substituted hydrocarbon and a 1-oxa-4-azacyclohexane derivative; (b) reacting the aqueous mixture; (c) obtaining a solution comprising an organo-1-oxa-4-azoniumcyclohexane compound; (d) forming a molecular sieve reaction mixture comprising reactive sources of the elements in the framework and the solution; and (e) heating the reaction mixture to form the molecular sieve.

In one aspect of the present invention, the 1-oxa-4-azonium cyclohexane salts are prepared from a substituted hydrocarbon and a 1-oxa-4-azacyclohexane derivative. Suitable substituted hydrocarbons include halogen substituted alkanes having between 2 and 8 carbon atoms, benzyl halides, 1-halomethane naphthalene, 2-halomethane naphthalene, halo-substituted non-olefinic alkyl groups having the formula $C_pH_{2p-1}$ where p is in the range from 4 to 10, α,ω-dihalogen substituted alkanes having between 3 and 6 carbon atoms, di-halogen substituted alkanes having between 3 and 8 carbon atoms, tri-halogen substituted alkanes having between 3 and 8 carbons, and combinations thereof. Halogens include chlorine, bromine and iodine. In an aspect, the halogen is bromine or iodine. In another aspect, the halogen is bromine. In an aspect, the identity of the halogen substitutions on a substituted hydrocarbon may be all different, all the same, or any combination thereof.

Suitable halogen substituted alkanes having between 2 and 8 carbon atoms include, but are not limited to, bromoethane, iodoethane, chloropropane, bromopropane, iodopropane, chlorobutane, 1-bromobutane, 2-bromobutane, iodobutane, 1-bromo-2-methylpropane, 2-bromo-2-methylpropane, chloropentane, bromopentane, iodopentane, 2-bromopentane, chlorohexane, bromohexane, iodohexane, benzyl bromide, 1-chloro-2-phenylethane, 1-bromo-2-phenylethane, and 1-iodo-2-phenylethane.

α,ω-dihalogen substituted alkanes having between 3 and 6 carbon atoms include, but are not limited to, 1,3-dichloropropane, 1,4-dichlorobutane, 1,5-dichloropentane, 1,6-dichlorohexane, 1,3-dibromopropane, 1,4-dibromobutane, 1,4-dibromo-2-methylbutane, 1,5-dibromopentane, 1,6-dibromohexane, 1,3-diiodopropane, 1,4-diiodobutane, 1,5-diiodopentane, 1,6-diiodohexane and combinations thereof.

Di-halogen substituted alkanes having between 3 and 8 carbon atoms suitably include, but are not limited to, 1,2-dibromopropane, 1,3-dibromobutane, 1,3-dibromopentane, 1,4-dibromopentane, 2,4-dibromopentane, 1,5-dibromohexane, 1,4-dibromohexane, 1,3-dibromohexane, 2,4-dibromohexane, 2,5-dibromohexane, 2,5-dibromo-3-methylhexane, 2,5-dibromo-3,3-dimethylhexane, 1,4-dibromo-2-ethylbutane, and 1,2-dibromo-2-phenylethane. Halogen substitutions may be chlorine, bromine or iodine, but are illustrated for bromine. In an aspect, the two halogen substitutions may be the same or different.

Tri-halogen substituted alkanes having between 3 and 8 carbons suitably include, but are not limited to, 1,2,3-tribromopropane, 1,2,4-tribromobutane, 1,2,3-tribromobutane, 1,3,5-tribromopentane, 1,2,4-tribromopentane, 1,2,3-tribromopentane, 1,3,6-tribromohexane, 1,2,4-tribromohexane, 1,2,5-tribromohexane, 1,2,6-tribromohexane, 1,3,4-tribromohexane, and 1,3,5-tribromohexane.

Halogen substitutions may be chlorine, bromine or iodine, but are illustrated for bromine. In an aspect, the identity of the three halogen substitutions on the substituted hydrocarbon may be all different, all the same, or any combination thereof.

In an aspect, the mole ratio of the 1-oxa-4-azacyclohexane derivative to the substitution is from 1:1 to 2:1 and is preferably from 1:1 to 1.5:1. Typically, the mole ratio of 1-oxa-4-azacyclohexane derivative to substitution is approximately 1. Thus, when butylbromide is used as the substituted hydrocarbon, approximately 1 equivalent of 1-oxa-4-azacyclohexane derivative is typically used, whereas when 1,4-dibromobutane is used as the substituted hydrocarbon, approximately 2 equivalents of 1-oxa-4-azacyclohexane derivative are typically used.

Figure 6A:
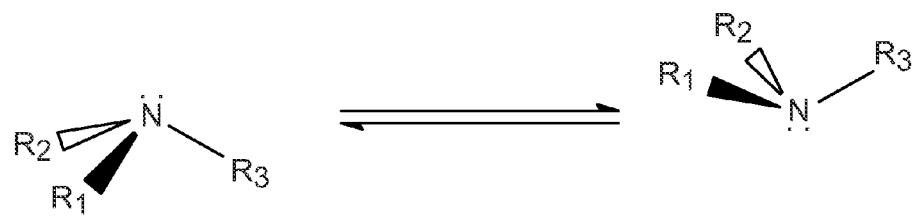
FIGS. 6A-B are illustrations of substituted amine compounds undergoing pyramidal inversion.
Figure 6B:
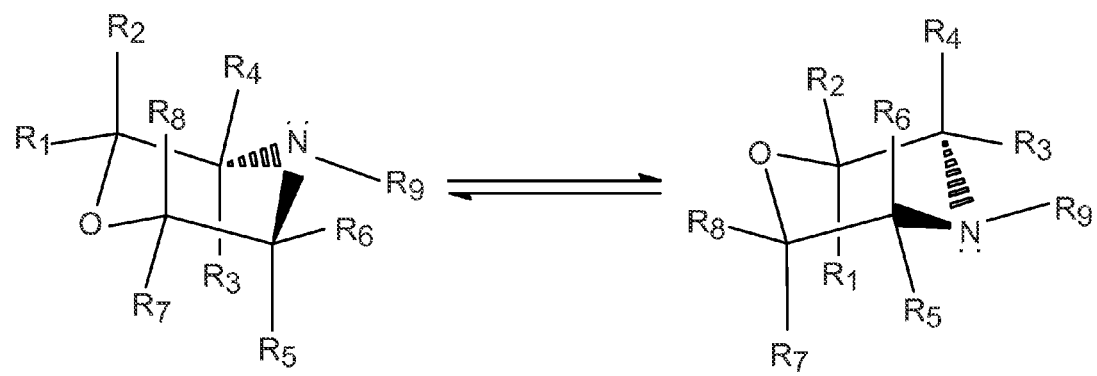

Suitable 1-oxa-4-azacyclohexane derivatives include those for which at least one conformer is essentially incapable of undergoing pyramidal inversion. The IUPAC definition of pyramidal inversion is given as, "a polytopal rearrangement in which the change in bond directions to a three-coordinate central atom having a pyramidal arrangement of bonds (tripodal arrangement) causes the central atom (apex of the pyramid) to appear to move to an equivalent position on the other side of the base of the pyramid. If the three ligands to the central atom are different pyramidal inversion interconverts enantiomers." The tripodal nature of many nitrogen compounds result in the ability of these compounds to undergo pyramidal inversion. Typically, the energy barrier to inversion is low for unconstrained molecules. For example, ammonia ($NH_3$) has an inversion barrier of 24.5 kJ $mol^{-1}$, with an observed inversion frequency of about $2.4*10^{10}$ $s^{-1}$, dimethylamine has an inversion barrier of 18 kJ $mol^{-1}$, triisopropylamine has an inversion barrier of 6-8 kJ $mol^{-1}$ and dimethylethylamine has an inversion barrier of 22 kJ $mol^{-1}$. However, inversion barrier energy can become very high when the nitrogen substituents are part of a small ring or other rigid molecule as in the case of 1-methylpyrrolidine. Molecules defined as essentially incapable of undergoing pyramidal inversion have an inversion barrier energy of at least about 28 kJ $mol^{-1}$ and more preferably of at least about 30 kJ $mol^{-1}$. A discussion of pyramidal inversion may be found in Rauk, A., et al., (1970), Pyramidal Inversion. *Angew. Chem. Int. Ed. Engl.*, 9: 400-414, with further discussion specifically for amines found in "Inorganic Chemistry" edited by Arnold F. Holleman, et al., Academic Press, 2001. Furthermore, FIGS. 6A-B illustrate substituted amine compounds undergoing pyramidal inversion. Molecules may exist in many conformers or folding patterns. For example, it is well known that both chair and boat forms of cyclohexane exist and interconvert between the two different conformers. In an aspect of the invention, at least one conformer of the amine is essentially incapable of undergoing pyramidal inversion.

TABLE 1

Molecules generally incapable of undergoing pyramidal inversion.

| Molecule Name | Inversion Barrier (kJ $mol^{-1}$) |
|---|---|
| N-methylhomopiperidine | 28-29 |
| 1-methyl-4-piperidone | 30.7 |
| Trimethylamine | 31-35 |
| 1,3,3-trimethylpyrrolidine | 31 |
| N-methylpyrrolidine | 31-35 |
| 3-methyl-1-thia-3-azacyclopentane | 33 |
| 9-methyl-9-azabicyclo[3.3.1]nonane | 34 |
| N-methyl piperidine (equatorial) | 36.4 |
| 1,2,2,6-tetramethylpiperidine (axial) | 38 |
| 2-methyl-dihydro-2-azaphenalene | 40.5 |
| Methylazetidine | 42 |
| 1,2,2,6-tetramethylpiperidine (equitorial) | 46 |
| 4-methyl-1-oxa-4-azacyclohexane AKA methylmorpholine | 48 |
| 2-methyl-1-oxa-2-azacyclohexane (equitorial) | 57 |
| 2-methyl-1-oxa-2-azacyclopentane | 65 |
| Methylaziridine | 80-90 |

The 1-oxa-4-azacyclohexane derivative is illustrated in FIG. 1 and has the structure of formula 5:

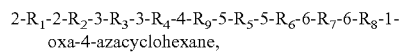

2-$R_1$-2-$R_2$-3-$R_3$-3-$R_4$-4-$R_9$-5-$R_5$-5-$R_6$-6-$R_7$-6-$R_8$-1-oxa-4-azacyclohexane, wherein $R_1$-$R_9$ are independently selected from H or an alkyl group having the formula $C_nH_{2n+1}$, and the total number of C atoms in the molecule is in the range of 4 to 12.

In some versions, $R_1$-$R_9$ are H.

In some versions, at least one of $R_1$-$R_9$ is an alkyl group. In some versions, at least two of $R_1$-$R_9$ are alkyl groups. In some versions, when at least two of $R_1$-$R_9$ are alkyl groups, two of the alkyl groups are on the same C atom (e.g., $R_1$ and $R_2$, or $R_3$ and $R_4$, or $R_5$ and $R_6$, or $R_7$ and $R_8$).

Where more than one alkyl group is present, the alkyl groups can be the same group or they can be different. Most commonly, the alkyl groups are methyl or ethyl groups.

Suitable 1-oxa-4-azacyclohexane derivatives include, but are not limited to, 4-butylmorpholine, 4-propylmorpholine, 4-ethylmorpholine, 4-methylmorpholine, morpholine, 2-methylmorpholine, 2,4-dimethylmorpholine, 4-ethyl-2-methylmorpholine, 4-propyl-2-methylmorpholine, 3-methylmorpholine, 3,4-dimethylmorpholine, 4-ethyl-3-methylmorpholine, 4-propyl-3-methylmorpholine, 5-methylmorpholine, 2,5-dimethylmorpholine, 4-ethyl-5-methylmorpholine, 4-propyl-5-methylmorpholine, 5-ethyl-2-methylmorpholine, 6-methylmorpholine, 4,6-dimethylmorpholine, 4-ethyl-6-methylmorpholine, 4-propyl-6-methylmorpholine, 2,6-dimethylmorpholine, 2,4,6-trimethylmorpholine, 4-ethyl-2,6-dimethylmorpholine, 2,3-dimethylmorpholine, 2,3,4-trimethylmorpholine, 4-ethyl-2,3-dimethylmorpholine, 2,5-dimethylmorpholine, 2,4,5-trimethylmorpholine, 4-ethyl-2,5-dimethylmorpholine, 2,2-dimethylmorpholine, 2,2,4-trimethylmorpholine, 4-ethyl-2,2-dimethylmorpholine, 3,3-dimethylmorpholine, 3,3,4-trimethylmorpholine, 4-ethyl-3,3-dimethylmorpholine, 5,5-dimethylmorpholine, 4,5,5-trimethylmorpholine, 4-ethyl-5,5-dimethylmorpholine, 6,6-dimethylmorpholine, 4,6,6-trimethylmorpholine, 4-ethyl-6,6-dimethylmorpholine, 5-ethyl-2-methylmorpholine and combinations thereof. Butyl may indicate n-butyl, sec-butyl, isobutyl or tert-butyl. Propyl may indicate n-propyl or isopropyl.

When the substituted hydrocarbon is an α,ω-dihalogen substituted alkane having between 3 and 6 carbon atoms, or a di-halogen substituted alkanes having between 3 and 8 carbon atoms, the 1-oxa-4-azonium cyclohexane salts may have the structure of either Formula 1 or Formula 2. When $R_9$ is an alkyl group, the structure of Formula 2 may be obtained. When $R_9$ is H, the structure of Formula 1 may be obtained.

When the substituted hydrocarbon is a tri-halogen substituted alkane having between 3 and 8 carbons, the 1-oxa-4-azonium cyclohexane salts may have the structure of Formula 3.

When the substituted hydrocarbon is a halogen substituted alkane having between 2 and 8 carbon atoms, benzyl halides, 1-halomethane naphthalene, 2-halomethane naphthalene, or a halo-substituted non-olefinic alkyl group having the formula $C_pH_{2p-1}$ where p is in the range from 4 to 10, the 1-oxa-4-azonium cyclohexane salts may have the structure of Formula 4.

The 1-oxa-4-azacyclohexane derivative includes $R_1$-$R_9$, and at least $R_{10}$ is from the substituted hydrocarbon. In some versions, the substituents at $R_1$-$R_8$ of the 1-oxa-4-azacyclohexane derivative and the substituents at $R_1$-$R_8$ of the 1-oxa-4-azoniumcyclohexane salt are the same. In some versions, the substituents at $R_1$-$R_9$ of the 1-oxa-4-azacyclohexane derivative and the substituents at $R_1$-$R_9$ of the 1-oxa-4-azoniumcyclohexane salt are the same.

One class of 1-oxa-4-azoniumcyclohexane salts have the structure of Formula 1:

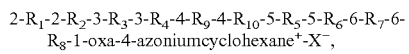

wherein $R_1$-$R_8$ are independently selected from H or an alkyl group having the formula $C_nH_{2n+1}$ where n is in the range from 1 to 4; $R_9$ and $R_{10}$ form a cyclic alkyl group having the formula $C_mH_{2m}$ forming a heterocycle of ring size q, where m is in the range from 4 to 8, and q is in the range of 5 to m+1; X is a halide or hydroxide; and the total number of C atoms in the molecule is in a range of 8 to 17.

In some versions, when $R_1$-$R_8$ are H, and m is 4, X is hydroxide. In some versions, when $R_1$-$R_8$ are H, m is in the range from 5 to 8.

In some versions, X is hydroxide.

The cyclic alkyl group can have from 4 to 8 carbons, and the heterocycle ring has a ring size of 5 to m+1. Most commonly, the heterocycle ring has 5 or 6 members. In some versions, q is 5. In some versions q is 6. In some versions, q is 5 or 6.

In some versions, $R_{10}$ can be a straight chain alkyl group or a branched alkyl group. When $R_{10}$ is a branched alkyl group, the heterocycle ring can have one or more alkyl substituents. For example, the use of 1,4-dibromo-4,4-dimethylbutane would yield a 5 member heterocycle ring with 2 methyl groups on the carbon adjacent to the nitrogen atom and the cyclic alkyl group has the formula $C_6H_{12}$.

In some versions, $R_1$-$R_8$ are H.

In some versions, at least one of $R_1$-$R_8$ is an alkyl group. In some versions, at least two of $R_1$-$R_8$ are alkyl groups. In some versions, when at least two of $R_1$-$R_8$ are alkyl groups, two of the alkyl groups are on the same C atom (e.g., $R_1$ and $R_2$, or $R_3$ and $R_4$, or $R_5$ and $R_6$, or $R_7$ and $R_8$).

Where more than one alkyl group is present, the alkyl groups can be the same group or they can be different. Most commonly, the alkyl groups are methyl or ethyl groups.

In one version, the cyclic alkyl group has 5 carbons, q is 6, $R_1$-$R_8$ are H, and X is a halide.

Figure 7A:
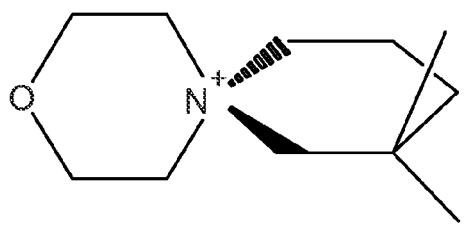
FIGS. 7A-D are illustrations of quaternary ammonium compounds formed from 1-oxa-4-azacyclohexane derivatives.

As an example, FIG. 7A shows the 3-oxa-6-azonia-8,8-dimethylspiro[5.5]undecane product formed from the reaction of 1,5-dibromo-2,2-dimethylpentane with morpholine.

Another class of 1-oxa-4-azonium cyclohexane salts have the structure of Formula 2:

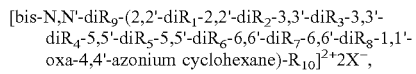

wherein $R_1$-$R_9$ are independently selected from H or an alkyl group having the formula $C_nH_{2n+1}$, where n is in the range from 1 to 4, X is halide or hydroxide, the total number of C atoms in the molecule is in the range of 11 to 24, and $R_{10}$ is an alkyl group having the formula $C_mH_{2m}$, where m is in the range from 3 to 8 and is connected to the 4 and 4' N atoms at positions x and y of the alkyl chain where x and y are independently selected from 1 to m.

In some versions, when $R_1$-$R_8$ are H, $R_9$ is $CH_3$, $R_{10}$ is $C_4H_8$, x is 1, and y is 4, X is hydroxide; or when $R_1$-$R_8$ are H, $R_9$ is $CH_3$, $R_{10}$ is $C_5H_{10}$, x is 1, and y is 5, X is hydroxide; or when $R_1$-$R_8$ are H, $R_9$ is $CH_3$, $R_{10}$ is $C_6H_{12}$, x is 1, and y is 6, X is hydroxide; or when $R_1$-$R_8$ are H, $R_9$ is $CH_3$, $R_{10}$ is $C_7H_{14}$, x is 1, and y is 7, X is hydroxide; or when $R_1$-$R_8$ are H, $R_9$ is $C_2H_5$, $R_{10}$ is $C_6H_{12}$, x is 1, and y is 6, X is hydroxide.

In some versions, when $R_1$-$R_8$ are H and $R_9$ is $CH_3$ or $C_2H_5$, then X is hydroxide. In some versions, when $R_1$-$R_8$ are H and $R_9$ is $CH_3$, then m is 3 or 8. In some versions, when $R_1$-$R_8$ are H and $R_9$ is $C_2H_5$, then m is 3, 4, 5, 7, or 8. In some versions, when $R_1$-$R_8$ are H and $R_9$ is $CH_3$, then y is not equal to m. In some versions, when $R_1$-$R_8$ are H and $R_9$ is $C_2H_5$, then y is not equal to m. In some versions, when $R_1$-$R_8$ are H and $R_9$ is an alkyl group, then y is not equal to m.

In some versions, when $R_9$ is $CH_3$ or $C_2H_5$, then X is hydroxide. In some versions, when $R_9$ is $CH_3$, then m is 3 or 8. In some versions, when $R_9$ is $C_2H_5$, then m is 3, 4, 5, 7, or 8. In some versions, when $R_9$ is $CH_3$, then y is not equal to m. In some versions, when $R_9$ is $C_2H_5$, then y is not equal to m. In some versions, when $R_9$ is an alkyl group, then y is not equal to m.

In some versions, X is hydroxide.

In some versions, $R_{10}$ is a straight chain alkyl group (i.e., x is 1 and y is m).

In some versions, when $R_9$ is an alkyl group, X is hydroxide.

In some versions, $R_9$ is a methyl group. In some versions, $R_9$ is a methyl group and $R_{10}$ has 4 carbons. In some versions, $R_9$ is a methyl group, $R_{10}$ has 4 carbons, and $R_{10}$ is attached at the end of the chain to the two morpholine rings (i.e., x is 1, and y is 4). In some versions, the compound is a dihalide or a dihydroxide of 1,4-bis(4-methylmorpholinium)butane.

In some versions, $R_1$-$R_8$ are H. In some versions, when $R_1$-$R_8$ are H, $R_9$ is an alkyl group. In some versions, when $R_1$-$R_8$ are H, $R_9$ is H. In some versions, when $R_1$-$R_8$ are H and $R_9$ is $CH_3$, y and m do not have the same value. In some versions, when $R_1$-$R_8$ are H and $R_9$ is $C_2H_5$, m is selected from the group consisting of 3, 4, 5, 7, and 8.

In some versions, at least one of $R_1$-$R_8$ is an alkyl group. In some versions when at least one of $R_1$-$R_8$ is an alkyl group, $R_9$ is an alkyl group. In some versions, when at least one of $R_1$-$R_8$ is an alkyl group, $R_9$ is H.

In some versions, at least two of $R_1$-$R_8$ are alkyl groups. In some versions, when at least two of $R_1$-$R_8$ are alkyl groups, two of the alkyl groups are on the same C atom (e.g., $R_1$ and $R_2$, or $R_3$ and $R_4$, or $R_5$ and $R_6$, or $R_7$ and $R_8$).

Where more than one of $R_1$-$R_9$ is an alkyl group, the alkyl groups can be the same group or they can be different. Most commonly, the alkyl groups are methyl or ethyl groups.

In some versions, the 1-oxa-4-azonium cyclohexane salt comprises at least one of the di-halides or di-hydroxides of bis: 4-butylmorpholine, 4-propylmorpholine, 4-ethylmorpholine, 4-methylmorpholine, morpholine, 2-methylmorpholine, 2,4-dimethylmorpholine, 4-ethyl-2-methylmorpholine, 4-propyl-2-methylmorpholine, 3-methylmorpholine, 3,4-dimethylmorpholine, 4-ethyl-3-methylmorpholine, 4-propyl-3-methylmorpholine, 5-methylmorpholine, 2,5-dimethylmorpholine, 4-ethyl-5-methylmorpholine, 4-propyl-5-methylmorpholine, 5-ethyl-2-methylmorpholine, 6-methylmorpholine, 4,6-dimethylmorpholine, 4-ethyl-6-methylmorpholine, 4-propyl-6-methylmorpholine, 2,6-dimethylmorpholine, 2,4,6-trimethylmorpholine, 4-ethyl-2,6-dimethylmorpholine, 2,3-dimethylmorpholine, 2,3,4-trimethylmorpholine, 4-ethyl-2,3-dimethylmorpholine, 2,5-dimethylmorpholine, 2,4,5-trimethylmorpholine, 4-ethyl-2,5-dimethylmorpholine, 2,2-dimethylmorpholine, 2,2,4-trimethylmorpholine, 4-ethyl-2,2-dimethylmorpholine, 3,3-dimethylmorpholine, 3,3,4-trimethylmorpholine, 4-ethyl-3,3-dimethylmorpholine, 5,5-dimethylmorpholine, 4,5,5-trimethylmorpholine, 4-ethyl-5,5-dimethylmorpholine, 6,6-dimethylmorpholine, 4,6,6-trimethylmorpholine, 4-ethyl-6,6-dimethylmorpholine, 5-ethyl-2-methylmorpholine and combinations thereof. Butyl may indicate n-butyl, sec-butyl, isobutyl or tert-butyl. Propyl may indicate n-propyl or isopropyl.

Figure 7B:
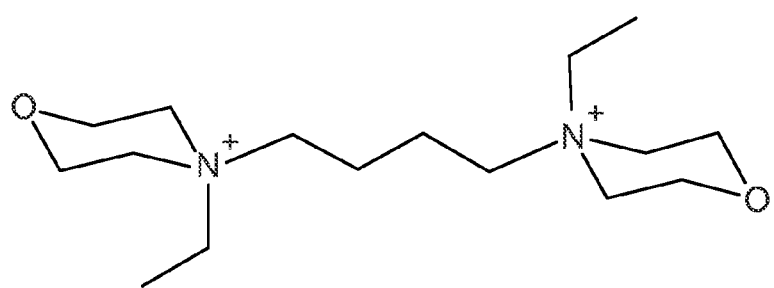

As an example, FIG. 7B shows the 1,4-bis(4-ethylmorpholinium)butane dibromide product formed from the reaction of 1,4-dibromobutane with 4-ethylmorpholinium.

Another class of 1-oxa-4-azonium cyclohexane salts have the structure of Formula 3:

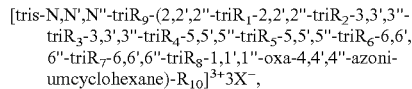

[tris-N,N',N''-triR$_9$-(2,2',2''-triR$_1$-2,2',2''-triR$_2$-3,3',3''-triR$_3$-3,3',3''-triR$_4$-5,5',5''-triR$_5$-5,5',5''-triR$_6$-6,6',6''-triR$_7$-6,6',6''-triR$_8$-1,1',1''-oxa-4,4',4''-azoniumcyclohexane)-R$_{10}$]$^{3+}$3X$^-$, wherein $R_1$-$R_9$ are independently selected from H or an alkyl group having the formula $C_nH_{2n+1}$, where n is in the range from 1 to 4, X is halide or hydroxide, the total number of C atoms in the molecule is the range of 15 to 36, and $R_{10}$ is an alkyl group having the formula $C_mH_{2m-1}$, where m is in the range from 3 to 8 and is connected to the 4, 4' and 4" N atoms at positions x, y and z of the alkyl chain where x, y and z are independently selected from 1 to m.

In some versions, X is hydroxide.

In some versions, when $R_9$ is an alkyl group, X is hydroxide.

In some versions, $R_9$ is an alkyl group. In some versions, $R_9$ is a methyl or ethyl group.

In some versions, x is 1 and z is m. In some versions, x is 1 and z is m−1. In some versions, x is 1 and z is m−2. In some versions, m is in the range from 4 to 8 or from 4 to 7.

In some versions, $R_1$-$R_8$ are H. In some versions, when $R_1$-$R_8$ are H, $R_9$ is an alkyl group. In some versions, when $R_1$-$R_8$ are H, $R_9$ is a methyl or ethyl group. In some versions, when $R_1$-$R_8$ are H, $R_9$ is H.

In some versions, at least one of $R_1$-$R_8$ is an alkyl group. In some versions when at least one of $R_1$-$R_8$ is an alkyl group, $R_9$ is an alkyl group. In some versions when at least one of $R_1$-$R_8$ is an alkyl group, $R_9$ is a methyl or ethyl group. In some versions when at least one of $R_1$-$R_8$ is an alkyl group, $R_9$ is H.

In some versions, at least two of $R_1$-$R_8$ are alkyl groups. In some versions, when at least two of $R_1$-$R_8$ are alkyl groups, two of the alkyl groups are on the same C atom (e.g., $R_1$ and $R_2$, or $R_3$ and $R_4$, or $R_5$ and $R_6$, or $R_7$ and $R_8$).

Where more than one alkyl group is present, the alkyl groups can be the same group or they can be different. Most commonly, the alkyl groups are methyl or ethyl groups.

In some versions, the 1-oxa-4-azoniumcyclohexane salt comprises at least one of the tri-halides or tri-hydroxides of tris: 4-butylmorpholine, 4-propylmorpholine, 4-ethylmorpholine, 4-methylmorpholine, morpholine, 2-methylmorpholine, 2,4-dimethylmorpholine, 4-ethyl-2-methylmorpholine, 4-propyl-2-methylmorpholine, 3-methylmorpholine, 3,4-dimethylmorpholine, 4-ethyl-3-methylmorpholine, 4-propyl-3-methylmorpholine, 5-methylmorpholine, 2,5-dimethylmorpholine, 4-ethyl-5-methylmorpholine, 4-propyl-5-methylmorpholine, 5-ethyl-2-methylmorpholine, 6-methylmorpholine, 4,6-dimethylmorpholine, 4-ethyl-6-methylmorpholine, 4-propyl-6-methylmorpholine, 2,6-dimethylmorpholine, 2,4,6-trimethylmorpholine, 4-ethyl-2,6-dimethylmorpholine, 2,3-dimethylmorpholine, 2,3,4-trimethylmorpholine, 4-ethyl-2,3-dimethylmorpholine, 2,5-dimethylmorpholine, 2,4,5-trimethylmorpholine, 4-ethyl-2,5-dimethylmorpholine, 2,2-dimethylmorpholine, 2,2,4-trimethylmorpholine, 4-ethyl-2,2-dimethylmorpholine, 3,3-dimethylmorpholine, 3,3,4-trimethylmorpholine, 4-ethyl-3,3-dimethylmorpholine, 5,5-dimethylmorpholine, 4,5,5-trimethylmorpholine, 4-ethyl-5,5-dimethylmorpholine, 6,6-dimethylmorpholine, 4,6,6-trimethylmorpholine, 4-ethyl-6,6-dimethylmorpholine, 5-ethyl-2-methylmorpholine and combinations thereof.

Figure 7C:
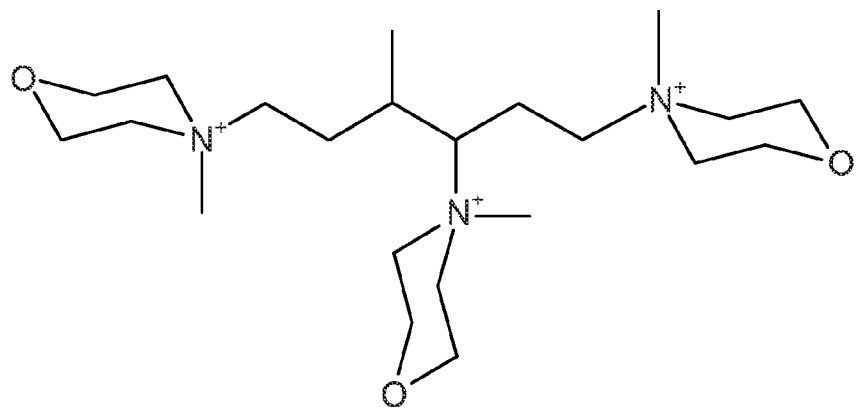

As an example, FIG. 7C shows the 1,3,6-tris(4-methylmorpholinium) 4-methylhexane tribromide product formed from the reaction of 1,3,6-tribromo-4-methylhexane with 4-methylmorpholine.

Still another class of 1-oxa-4-azonium cyclohexane salts have the structure Formula 4:

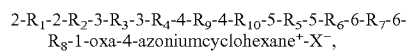

2-R$_1$-2-R$_2$-3-R$_3$-3-R$_4$-4-R$_9$-4-R$_{10}$-5-R$_5$-5-R$_6$-6-R$_7$-6-R$_8$-1-oxa-4-azoniumcyclohexane$^+$-X$^-$, wherein $R_1$-$R_9$ are independently selected from H or an alkyl group having the formula $C_nH_{2n+1}$, $R_{10}$ is selected from an alkyl group having the formula $C_nH_{2n+1}$ where n is in the range from 1 to 4, benzyl, 1-methylnaphthalene, 2-methylnaphthalene and a non-olefinic alkyl group having the formula $C_pH_{2p-1}$ where p is in the range from 4 to 10, X is halide or hydroxide, and the total number of C atoms in the molecule is in the range of 4 to 16.

In some versions, X is hydroxide.

In some versions, when $R_9$ is an alkyl group, X is hydroxide.

In some versions, $R_9$ is an alkyl group. In some versions, $R_9$ is a methyl or ethyl group.

In some versions, $R_1$-$R_9$ are H.

In some versions, $R_1$-$R_8$ are H. In some versions, when $R_1$-$R_8$ are H, $R_9$ is an alkyl group. In some versions, when $R_1$-$R_8$ are H, $R_9$ is a methyl or ethyl group. In some versions, when $R_1$-$R_8$ are H, $R_9$ is H.

In some versions, at least one of $R_1$-$R_8$ is an alkyl group. In some versions when at least one of $R_1$-$R_8$ is an alkyl group, $R_9$ is an alkyl group. In some versions when at least one of $R_1$-$R_8$ is an alkyl group, $R_9$ is a methyl or ethyl group. In some versions when at least one of $R_1$-$R_8$ is an alkyl group, $R_9$ is H.

In some versions, at least two of $R_1$-$R_8$ are alkyl groups. In some versions, when at least two of $R_1$-$R_8$ are alkyl groups, two of the alkyl groups are on the same C atom (e.g., $R_1$ and $R_2$, or $R_3$ and $R_4$, or $R_5$ and $R_6$, or $R_7$ and $R_8$).

Where more than one alkyl group is present, the alkyl groups can be the same group or they can be different. Most commonly, the alkyl groups are methyl or ethyl groups.

In some versions, when at least two of $R_1$-$R_8$ are alkyl groups, at least one of $R_9$ and $R_{10}$ is the alkyl group having the formula $C_nH_{2n+1}$.

In some versions $R_{10}$ is the alkyl group having the formula $C_nH_{2n+1}$. In some versions, $R_{10}$ is a propyl or butyl group. In some versions, the $R_{10}$ alkyl group can be a straight chain alkyl group or a branched alkyl group.

In some versions, $R_{10}$ is benzyl. In some versions, when $R_{10}$ is benzyl, at least one of $R_1$-$R_8$ is an alkyl group. In some versions, when $R_{10}$ is benzyl, $R_9$ is an alkyl group. In some versions, when $R_{10}$ is benzyl, $R_9$ is H.

In some versions, $R_{10}$ is 1-methylnaphthalene or 2-methylnaphthalene. In some versions, when $R_{10}$ is 1-methylnaphthalene or 2-methylnaphthalene, at least one of $R_1$-$R_8$ is an alkyl group. In some versions, when $R_{10}$ is 1-methylnaphthalene or 2-methylnaphthalene, $R_9$ is an alkyl group. In some versions, when $R_{10}$ is 1-methylnaphthalene or 2-methylnaphthalene, $R_9$ is H.

In some versions, $R_{10}$ is the non-olefinic alkyl group having the formula $C_pH_{2p-1}$ where p is in the range from 4 to 10. In some versions, when $R_{10}$ is the non-olefinic alkyl group, at least one of $R_1$-$R_8$ is an alkyl group. In some versions, when $R_{10}$ is the non-olefinic alkyl group, $R_9$ is an alkyl group. In some versions, when $R_{10}$ is the non-olefinic alkyl group, $R_9$ is H. In some versions, $R_{10}$ is selected from the group consisting of cyclobutyl, cyclopentyl, cyclohexyl, methylcyclopentyl, cycloheptyl, methylcyclohexyl, dimethylcyclopentyl, cyclooctyl and dimethylcyclohexyl. Suitable non-olefinic alkyl groups having the formula $C_pH_{2p-1}$ where p is in the range from 4 to 10 include, but are not limited to cyclobutyl, cyclopentyl, cyclohexyl, methylcyclopentyl, cycloheptyl, methylcyclohexyl, dimethylcyclopentyl, cyclooctyl and dimethylcyclohexyl. In some versions, p is in the range from 5 to 8.

In some versions, the 1-oxa-4-azonium cyclohexane salt comprises at least one of the halides or hydroxides of: 4-butylmorpholine, 4-propylmorpholine, 4-ethylmorpholine, 4-methylmorpholine, morpholine, 2-methylmorpholine, 2,4-dimethylmorpholine, 4-ethyl-2-methylmorpholine, 4-propyl-2-methylmorpholine, 3-methylmorpholine, 3,4-dimethylmorpholine, 4-ethyl-3-methylmorpholine, 4-propyl-3-methylmorpholine, 5-methylmorpholine, 2,5-dimethyl-morpholine, 4-ethyl-5-methylmorpholine, 4-propyl-5-methylmorpholine, 5-ethyl-2-methylmorpholine, 6-methylmorpholine, 4,6-dimethylmorpholine, 4-ethyl-6-methylmorpholine, 4-propyl-6-methylmorpholine, 2,6-dimethylmorpholine, 2,4,6-trimethylmorpholine, 4-ethyl-2,6-dimethylmorpholine, 2,3-dimethylmorpholine, 2,3,4-trimethylmorpholine, 4-ethyl-2,3-dimethylmorpholine, 2,5-dimethylmorpholine, 2,4,5-trimethylmorpholine, 4-ethyl-2,5-dimethylmorpholine, 2,2-dimethylmorpholine, 2,2,4-trimethylmorpholine, 4-ethyl-2,2-dimethylmorpholine, 3,3-dimethylmorpholine, 3,3,4-trimethylmorpholine, 4-ethyl-3,3-dimethylmorpholine, 5,5-dimethylmorpholine, 4,5,5-trimethylmorpholine, 4-ethyl-5,5-dimethylmorpholine, 6,6-dimethylmorpholine, 4,6,6-trimethylmorpholine, 4-ethyl-6,6-dimethylmorpholine, 5-ethyl-2-methylmorpholine and combinations thereof.

Figure 7D:
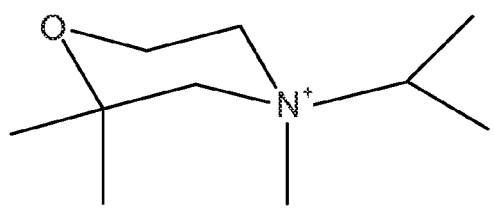

As an example, FIG. 7D shows the 4-isopropyl(4,6,6-trimethylmorpholinium) bromide product formed from the reaction of 2-bromopropane with 4,6,6-trimethylmorpholine.

The 1-oxa-4-azonium cyclohexane halide salt can be ion-exchanged, either by reaction with $Ag_2O$ yielding AgX as a byproduct or by passage across anion exchange resins to yield the hydroxide form of the 1-oxa-4-azonium cyclohexane compound or used as the halogen salt directly.

The ion-exchange process may involve contacting the 1-oxa-4-azonium cyclohexane halide salt with an ion-exchange resin having hydroxide ions. A particular ion-exchange resin capable of converting halide ions to hydroxide ions is Dowex Monosphere 550A UPW, available from Dow Chemical. The ion exchange may take place at temperatures from about 20° C. to about 85° C. or from about 20° C. to about 50° C. or from about 25° C. to about 40° C. for times from about 15 minutes to about 8 hours or from about 30 minutes to about 6 hours or from about 30 minutes to about 3 hours. The ion exchange may be performed in continuous or batch mode or any combination thereof. Batch mode is preferred when using $Ag_2O$ and continuous mode is preferred when using ion exchange resin. Individual 1-oxa-4-azonium cyclohexane halide salts may require different operating conditions for the ion exchange from halide to hydroxide. Depending on the interaction of anion with the 1-oxa-4-azonium cyclohexane cation, ion-exchange may be difficult or impossible.

Comparing the $^{13}C$ chemical shifts for the bromide and hydroxide salts in Example 2 and Example 3 shows that the interaction of the 1-oxa-4-azonium cyclohexane salt with the anion varies with the identity of the anion. In particular, without wishing to be bound to theory, the chemical potential of the C atom next to the cationic N center is particularly affected. The electron density of the salt can be greatly affected by the identity of the anion. This difference can greatly affect the ability of the 1-oxa-4-azonium cyclohexane anion salt to direct the synthesis of particular zeolites or molecular sieves. In molecular sieve synthesis, hydroxide is typically used as a mineralizing agent, so hydroxide SDA salts are often preferred to halide SDA salts.

The methods of the present invention may be carried out in preparation of microporous crystalline molecular sieves. In one aspect, the invention provides a method for synthesizing a molecular sieve, such as an aluminophosphate or a silicoaluminophosphate. The method may include the steps of: (a) preparing an aqueous mixture comprising water, a substituted hydrocarbon and a 1-oxa-4-azacyclohexane derivative; (b) reacting the aqueous mixture; (c) obtaining a solution comprising an organo-1-oxa-4-azoniumcyclohexane compound; (d) forming a reaction mixture comprising reactive sources of Al, Si, and P, and the solution; and (e) heating the reaction mixture to form the molecular sieve.

In another version of the method, step (d) comprises forming a first mixture of the reactive sources of Me, Al, Si, P and the optional seeds of a molecular sieve, and adding the solution to the first mixture without cooling the first mixture.

In another version of the method, step (d) comprises forming a first mixture of the reactive sources of Me, Al, P and the optional seeds of a molecular sieve, and adding the solution to the first mixture without cooling the first mixture.

The step of forming an aluminophosphate reaction mixture comprises forming a reaction mixture of a composition expressed in terms of mole ratios of the oxides of: $rR:Al_2O_3:eMeO_{j/2}:pP_2O_5:sSiO_2:gH_2O$ where, "r" has a value from about 0.01 to about 10, "e" has a value of 0 to about 1.0, "j" has a value from 2 to 4, "p" has a value of about 0.5 to about 8.0, "s" has a value of 0 to about 1.0, and "g" has a value of about 5 to about 4000. Additionally, the reaction mixture may comprise from about 1 to about 10 wt.-% of seed aluminophosphate based on the total mass of oxides in the reaction mixture, e.g., if there are 100 g of oxides in the reaction mixture, from about 1 to about 10 g of seed aluminophosphate would be added to the reaction mixture. In an aspect, the reaction mixture may additionally comprise another organoammonium or amine structure directing agent. R represents the organo-1-oxa-4-azoniumcyclohexane compound. Me represents an element selected from the main group elements Mg, Zn, Be, Ga, or from the first, second or third transition series. Non-limiting examples of this element include Ti, Fe, Co, Mg, Mn, Cu, Ni and Zn.

Sources of aluminum include, but are not limited to, aluminum alkoxides, precipitated aluminas, aluminum metal, aluminum hydroxide, aluminum salts and alumina sols. Specific examples of aluminum alkoxides include, but are not limited to, aluminum sec-butoxide and aluminum isopropoxide. Sources of silica include, but are not limited to, tetraethylorthosilicate, colloidal silica, and precipitated silica. Source of phosphorous include, but are not limited to, orthophosphoric acid and phosphorous oxides.

The examples demonstrate a specific order of addition leading to the reaction mixtures from which the OSDAs described herein are formed. However, as there are a number of starting materials, many orders of addition are possible.

The molecular sieves prepared from the OSDAs of the process of this invention can be used as a catalyst or catalyst support in various hydrocarbon conversion processes. Hydrocarbon conversion processes are well known in the art and include cracking, hydrocracking, alkylation of aromatics or isoparaffins, isomerization of paraffin, olefins, or poly-alkylbenzene such as xylene, trans-alkylation of poly-alkybenzene with benzene or mono-alkybenzene, disproportionation of mono-alkybenzene, polymerization, reforming, hydrogenation, dehydrogenation, transalkylation, dealkylation, hydration, dehydration, hydrotreating, hydrodenitrogenation, hydrodesulfurization, methanation and syngas shift process.

EXAMPLES

In order to more fully illustrate the invention, the following examples are set forth. It is to be understood that the examples are only by way of illustration and are not intended as a limitation on the broad scope of the invention as set forth in the appended claims.

Example 1

422.44 g water was weighed into a 2 L Teflon bottle, and the bottle was placed in a 4 L beaker. Under constant stirring, 218.1 g 1,4 dibromobutane, 99% was added to the water. To this mixture, 204.34 g 4-Methylmorpholine, 99% was added. Approximately 1.5 L tap water was placed in the 4 L beaker surrounding the Teflon bottle to help control the heat of reaction. Low heat, approximately 50° C., was used to warm up the mixture. Stirring was continued until a yellow solution was formed and no clear additional phase was present. $^{13}$C NMR of the solution showed a ratio of 1 mole methylmorpholine to 2.83 moles 1,4-bis(4-methylmorpholinium)butane dibromide.

Example 2

413 g water was weighed into a 2 L Teflon bottle. 474.1 g. 1,5 Dibromopentane, 97% (2 moles) was added. To this mixture, 176 g. Morpholine, 99% (4 moles) was added while stirring. The water and morpholine combined to form a cloudy phase while the denser dibromopentane remained on the bottom. The Teflon bottle was moved into a 4 liter beaker as secondary containment and placed under a high speed overhead stirrer for stirring at room temperature. Approximately 1-1.5 liters of cool water were added to the 4 liter beaker to disperse a strong exotherm should one occur. At about 15 minutes, the mixture began to turn yellow, indicating the reaction was beginning. The exotherm was mild. After an hour, the result was a clear light orange "solution". The remaining 413 g water was mixed in to make the final solution. $^{13}$C nuclear magnetic resonance (NMR) was used to confirm that the product comprises a 3-oxa-6-azoniaspiro [5.5]undecane bromide solution. Peaks for the spirocyclic compound were observed at 63.6, 59.9, 58.0, 21.0, and 18.9 ppm with respect to tetramethylsilane. Resonances for morpholinium were present at 59.9 and 43.4 ppm. The ratio of spirocyclic compound to morpholinium was 1:1. Variable temperature NMR, with C—N splitting is required to identify both compounds and acquire the proper integration ratios. The starting material 1,5-dibromopentane has peaks at 29.3, 34.4, and 36.2 ppm with integral ratios of 1:2:2 respectively which is not observed in the final solution.

Example 3

1150 grams of the solution from Example 2 was contacted with 336.4 grams of $Ag_2O$ in a round-bottom flask, which combined to form a grey opaque solution. The flask was placed under a high speed overherad stirrer for stirring at room temperature (open system) for 1 day. The sample was filtered to remove the precipitated silver bromide and the final solution was sent for water analysis which showed that the sample was composed of 64.6% water. $^{13}$C nuclear magnetic resonance (NMR) was used to confirm that the product comprises a 3-oxa-6-azoniaspiro[5.5]undecane hydroxide solution. Peaks for the spirocyclic compound were observed at 67.1, 60.0, 57.9, 20.9, and 18.7 ppm with respect to tetramethylsilane. Resonances for morpholinium were present at 59.8 and 44.7 ppm. The ratio of spirocyclic compound to morpholinium was about 1:1. Comparing the $^{13}$C chemical shifts for the bromide and hydroxide salts in Example 2 and Example 3 shows that the interaction of the 1-oxa-4-azonium cyclohexane salt with the anion varies with the identity of the anion. In particular, without wishing to be bound to theory, the chemical potential of the C atom next to the cationic N center is particularly affected. The electron density of the salt can be greatly affected by the identity of the anion.

Example 4

88.65 g water was weighed into a 1 L Teflon bottle. 141.33 g 1,4-Dibromobutane, 99% was added. To this mixture, 154 g 4-Ethylmorpholine, 97% was added. The water and ethylmorpholine combined to form a cloudy phase while the denser dibromobutane remained on the bottom. The Teflon bottle was moved into a 2 liter beaker as secondary containment and placed under a high speed overhead stirrer for stirring at room temperature. The Teflon bottle was sealed and placed at 100° C. overnight with no stirring. After the solution was cooled back down to room temperature, 88 g of deionized water was added to the solution. The solution was again placed at 100° C. overnight with no stirring and the result was a brown translucent solution which, by $^{13}$C NMR contained peaks for 1,4-bis(4-ethylmorpholinium)butane dication. The sample was sent for water analysis which showed that it was composed of 36.6% water.

Example 5

355.88 g water was weighed into a 2 L glass beaker. 355.57 g 1,5-Dibromopentane, 97% (1.5 moles) was added.

To this mixture, 356.19 g 4-Ethylmorpholine, 97% (3 moles) was added. The water and ethylmorpholine combined to form a cloudy phase while the denser dibromopentane remained on the bottom. The glass beaker was moved onto a hot plate with low heat and placed under a high speed overhead stirrer for stirring at room temperature. The solution was then transferred into a 2 L Teflon bottle, which was sealed and placed at 100° C. overnight with no stirring. After cooling, the solution as placed into a 2 L Parr autoclave and heated to 100° C. for 4 hours. 355.88 g of deionized water was then added to obtain a 50% solution.

Example 6

196.5 g, water was weighed into a 2 L Teflon bottle. 254.14 g 1,6-Dibromohexane, 96% was added. To this mixture, 204.34 g 4-Methylmorpholine, 99% was added. The water and morpholine combined to form a cloudy phase while the denser dibromohexane remained on the bottom. The solution was put in a 4 liter beaker as secondary containment and placed under a high speed overhead stirrer for stirring at room temperature. The solution was then transferred into a 2 L Parr autoclave, which was sealed and placed at 125° C. overnight with no stirring. 261.9 g deionized water was then added to obtain a 50% solution and the sample was placed back into the 2 L Parr autoclave at 125° C. overnight. The result was a brown clear solution. $^{13}$C NMR showed peaks at 65.5, 60.6, 59.7, 47.0, 25.3, and 21.1 ppm in a 1:2:2:1:1:1 ratio for 1,6-bis(4-Methylmorpholinium)hexane dibromide and peaks at 64.9, 53.9, and 44.5 ppm in a 2:2:1 ratio for starting material 4-methylmorpholine. The ratio of diquaternary compound to amine was 1:0.9.

Example 7

439 grams of the solution from Example 4 was contacted with 147.5 grams of Ag$_2$O in a round-bottom flask, which combined to form a grey opaque solution. The flask was placed under a high speed overheard stirrer for stirring at room temperature for 1 day. The sample was filtered to remove the precipitated silver bromide and the final solution was sent for water analysis which showed that the sample was composed of 67.0% water.

Example 8

1257 grams of the solution from Example 5 was contacted with 324.26 grams of Ag$_2$O in a round-bottom flask, which combined to form a grey opaque solution. The flask was placed under a high speed overheard stirrer for stirring at room temperature for 1 day. The sample was filtered to remove the precipitated silver bromide and the final solution was sent for water analysis which showed that the sample was composed of 65.9% water.

Example 9

1116 grams of the solution from Example 6 was contacted with 295.64 grams of Ag$_2$O in a round-bottom flask, which combined to form a grey opaque solution. The flask was placed under a high speed overheard stirrer for stirring at room temperature for 1 day. The sample was filtered to remove the precipitated silver bromide and the final solution was sent for water analysis which showed that the sample was composed of 60.9% water.

Example 10

25.73 g water was weighed into a 125 mL Teflon bottle. 12.57 g 1,4-Dibromobutane, 99% was added. To this mixture, 13.15 g 2,6-Dimethylmorpholine, 97.1% was added while stirring. The water and 2-6-dimethylmorpholine combined to form a cloudy phase while the denser dibromobutane remained on the bottom. The Teflon bottle was moved into a 400 mL beaker as secondary containment and placed on a hot plate for stirring under low heat while sealed, approximately 90° C. After two days, the result was a clear light yellow solution. The sample was sent for $^{13}$C NMR. The 1-oxa-4-azonium cyclohexane derivative 2,6-dimethylmorpholine is comprised of two compounds, A having peaks at 75.5, 55.1, and 21.9 ppm with 1:1:1 ratios and B having peaks at 69.1, 54.2, and 20.5 ppm with 1:1:1 ratios. The ratio of the two compounds is 2.75 A to 1 B. The yellow solution has peaks at 16.4, 17.2, 17.3, 17.7, 20.6, 21.0, 21.7, 46.5, 47.2, 59.4, 61.7, 63.0, 63.9, 64.0, 65.7, 68.1, 68.3 and 69.8 ppm with integral ratios of 1.25, 1.75, 3.7, 4, 1.2, 4.1, 2, 1.8, 4.35, 1.3, 1.5, 1.8, 4, 1.95, and 4 respectively. Without wishing to be bound by theory, it is believed that compounds A and B in the morpholine derivative are the cis and trans forms of the 2,6-dimethylmorpholine and peaks in the product are due to multiple conformers of cis and trans substituted dimethylmorpholine based salts.

Example 11

591.15 g water was weighed into a 2 L Teflon bottle. 436.21 g 1,4-Dibromobutane, 99% (2 moles) was added. To this mixture, 352.0 g Morpholine, 99% (4 moles) was added while stirring. The water and morpholine combined to form a cloudy phase while the denser dibromobutane remained on the bottom. The Teflon bottle was moved into a 4 liter beaker as secondary containment and placed under a high speed overhead stirrer for stirring at room temperature. Approximately 0.5-1 liters of cool water were added to the 4 liter beaker to disperse a strong exotherm should one occur. After 1.5-2.5 hours, the result was a clear light yellow solution. An additional 197.05 g water was mixed in to form the final solution. $^{13}$C nuclear magnetic resonance (NMR) was used to confirm that the product was an 8-oxa-5-azoniaspiro[4.5] decane bromide solution. Peaks for the spirocyclic compound were observed at 63.3, 62.3, 59.2, and 21.4 ppm with respect to tetramethylsilane with integral ratios of 2:2:2:2 respectively. Resonances for morpholinium were present at 63.9 and 43.5 ppm with integral ratios of 2:2. The ratio of spirocyclic compound to morpholinium was 1:1. The presence of both compounds was confirmed by ion chromatography/mass spectrometry. The starting material 1,4-dibromobutane has peaks in the $^{13}$C NMR at 33.5 and 35.5 ppm. Peaks due to the dibromobutane were not observed in the final solution.

Example 12

1200 grams of the solution from Example 6 was contacted with 365.5 grams of Ag$_2$O in a round-bottom flask, which combined to form a grey opaque solution. The flask was placed under a high speed overheard stirrer for stirring at room temperature for 1 day. The sample was filtered to remove the precipitated silver bromide and the final solution was sent for water analysis which showed that the sample was composed of 67.3% water.

Example 13

36.36 g of the compound Bis-N-methylmorpholinium hexane dihydroxide (Example 9) was added into 10.67 g deionized water. The solution was placed under a high speed overhead stirrer for stirring. 10.90 g of orthophosphoric acid was added (H₃PO₄; Fisher Scientific, 85%), followed by 6.28 g of psuedoboehmite (Catapal B; Sasol 72.0%), and lastly followed by 2.00 g of colloidal silica (Ludox AS40, Sigma-Aldrich, 40%). The gel was mixed for 30 minutes, and then transferred to a Teflon-lined stainless steel autoclave. The Gel Molar Oxide Ratio was:

1.07 $P_2O_5$:1.0 $Al_2O_3$:0.3 $SiO_2$:1.0 $BNMMH(OH)_2$:50 $H_2O$

Figure 8:
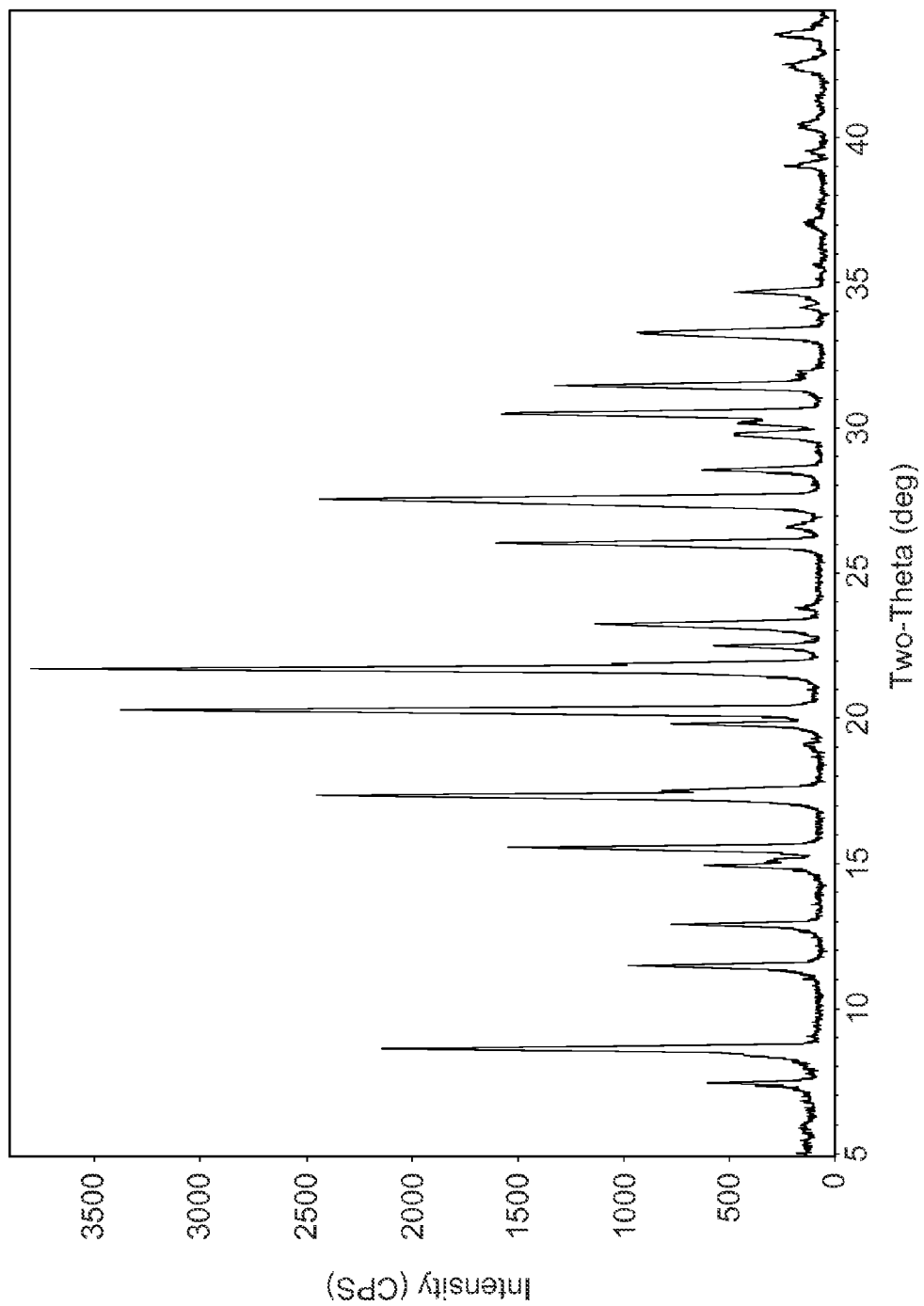
FIG. 8 shows the x-ray diffraction pattern of the Example 13 product.

The gel was heated and tumbled in an oven at 175° C. for 120 hours. After cooling the gel, the autoclave was opened, and the solids were isolated by centrifugation, washed with water, and dried at 100° C. overnight. The solids were characterized by x-ray diffraction, which were found to be SAPO-56 (AFX phase). The x-ray diffraction pattern of this material is shown in FIG. 8.

Example 14

41.10 g of the compound Bis-N-ethylmorpholinium butane dihydroxide (Example 7) was added into 10.45 g deionized water. The solution was placed under a high speed overhead stirrer for stirring. 10.45 g of orthophosphoric acid was added (H₃PO₄; Fisher Scientific, 85%), followed by 5.97 g of psuedoboehmite (Catapal B; Sasol 72.0%), and lastly followed by 1.90 g of colloidal silica (Ludox AS40, Sigma-Aldrich, 40%). The gel was mixed for 30 minutes, and then transferred to a Teflon-lined stainless steel autoclave. The Gel Molar Oxide Ratio was:

1.08 $P_2O_5$:1.0 $Al_2O_3$:0.3 $SiO_2$:1.0 $BNEMB(OH)_2$:50 $H_2O$

The gel was heated and tumbled in an oven at 175° C. for 96 hours. After cooling the gel, the autoclave was opened, and the solids were isolated by centrifugation, washed with water, and dried at 100° C. overnight. The solids were characterized by x-ray diffraction, which were found to be SAPO-34 (CHA phase)

Example 15

25.18 g of the compound Bis-N-methylmorpholinium hexane dihydroxide (Example 9) was added into 6.32 g deionized water. The solution was placed under a high speed overhead stirrer for stirring. 10.15 g of orthophosphoric acid was added (H₃PO₄; Fisher Scientific, 85%), followed by 5.80 g of psuedoboehmite (Catapal B; Sasol 72.0%), followed by 1.85 g of colloidal silica (Ludox AS40, Sigma-Aldrich, 40%), and lastly followed by 10.77 g of ethyltrimethylammonium hydroxide (ETMA: 20%, SAChem). The gel was mixed for 30 minutes, and then transferred to a Teflon-lined stainless steel autoclave. The Gel Molar Oxide Ratio was:

1.08 $P_2O_5$:1.0 $Al_2O_3$:0.3 $SiO_2$:0.75 $BNMMH(OH)_2$:0.5 ETMAOH:50 $H_2O$

The gel was heated and tumbled in an oven at 175° C. for 288 hours. After cooling the gel, the autoclave was opened, and the solids were isolated by centrifugation, washed with water, and dried at 100° C. overnight. The solids were characterized by x-ray diffraction, which were found to be SAPO-35 (LEV phase).

Example 16

43.40 g of the compound Bis-N-methylmorpholinium hexane dihydroxide (Example 9) was added into 13.78 g deionized water. The solution was placed under a high speed overhead stirrer for stirring. 12.82 g of orthophosphoric acid was added (H₃PO₄; Fisher Scientific, 85%), followed by 7.50 g of psuedoboehmite (Catapal B; Sasol 72.0%), and lastly followed by 0.80 g of colloidal silica (Ludox AS40, Sigma-Aldrich, 40%). The gel was mixed for 30 minutes, and then transferred to a Teflon-lined stainless steel autoclave. The Gel Molar Oxide Ratio was:

1.05 $P_2O_5$:1.0 $Al_2O_3$:0.1 $SiO_2$:1.0 $BNMMH(OH)_2$:50 $H_2O$

The gel was heated statically in an oven at 175° C. for 96 hours. After cooling the gel, the autoclave was opened, and the solids were isolated by centrifugation, washed with water, and dried at 100° C. overnight. The solids were characterized by x-ray diffraction, which were found to be SAPO-35 (LEV phase), along with a fraction of unreacted alumina.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A method for synthesizing an aluminophosphate based molecular sieve comprising:
    (a) preparing an aqueous mixture comprising water, a substituted hydrocarbon, and a 1-oxa-4-azacyclohexane derivative wherein said substituted hydrocarbons are selected from the group consisting of halogen substituted alkanes having between 2 and 8 carbon atoms, benzyl halides, 1-halomethane naphthalene, 2-halomethane naphthalene, halo-substituted non-olefinic alkyl groups having the formula $C_pH_{2p-1}$ where p is in the range from 4 to 10, α,ω-dihalogen substituted alkanes having between 3 and 6 carbon atoms, di-halogen substituted alkanes having between 3 and 8 carbon atoms, tri-halogen substituted alkanes having between 3 and 8 carbons, and combinations thereof;
    (b) reacting the aqueous mixture;
    (c) obtaining a solution comprising an organo-1-oxa-4-azoniumcyclohexane compound;
    (d) forming a reaction mixture comprising reactive sources of Al, Me, and P, and the solution wherein Me represents an element sleeted from the group consist of Mg, Zn, Be, Ga or an element from the first, second or third transition series of elements; and
    (e) heating the reaction mixture to form the molecular sieve.

2. The method of claim 1, wherein the step of reacting the aqueous mixture occurs at a temperature between 20° C. and 100° C.

3. The method of claim 1, wherein the organo-1-oxa-4-azoniumcyclohexane compound is a structure directing agent.

4. The method of claim 1 wherein the substituted hydrocarbon is a halogen substituted alkane selected from the group consisting of bromoethane, iodoethane, chloropropane, bromopropane, iodopropane, chlorobutane, 1-bromobutane, 2-bromobutane, iodobutane, 1-bromo-2-methylpropane, 2-bromo-2-methylpropane, chloropentane, bromopentane, iodopentane, 2-bromopentane, chlorohexane, bromohexane, iodohexane, benzyl halide, 1-chloro-2-phenylethane, 1-bromo-2-phenylethane, 1-iodo-2-phenylethane, 1-halomethane naphthalene, 2-halomethane naphthalene, and halo-substituted non-olefinic alkyl groups having the formula $C_pH_{2p-1}$ where p is in the range from 4 to 10, and combinations thereof.

5. The method of claim 1 wherein the substituted hydrocarbon is a dihalogen substituted alkane having between 2 and 8 carbon atoms selected from the group consisting of 1,3-dichloropropane, 1,4-dichlorobutane, 1,5-dichloropentane, 1,6-dichlorohexane, 1,3-dibromopropane, 1,4-dibromobutane, 1,5-dibromopentane, 1,6-dibromohexane, 1,3-diiodopropane, 1,4-diiodobutane, 1,5-diiodopentane, 1,6-diiodohexane, 1,2-dibromopropane, 1,3-dibromobutane, 1,3-dibromopentane, 1,4-dibromopentane, 2,4-dibromopentane, 1,5-dibromohexane, 1,4-dibromohexane, 1,3-dibromohexane, 2,4-dibromohexane, 2,5-dibromohexane, 2,5-dibromo-3-methylhexane, 2,5-dibromo-3,3-dimethylhexane, 1,4-dibromo-2-ethylbutane, and 1,2-dibromo-2-phenylethane, and combinations thereof.

6. The method of claim 1, wherein the substituted hydrocarbon is a tri-halogen substituted alkane having from 3 to 8 carbon atoms selected from the group consisting of 1,2,3-tribromopropane, 1,2,4-tribromobutane, 1,2,3-tribromobutane, 1,3,5-tribromopentane, 1,2,4-tribromopentane, 1,2,3-tribromopentane, 1,3,6-tribromohexane, 1,2,4-tribromohexane, 1,2,5-tribromohexane, 1,2,6-tribromohexane, 1,3,4-tribromohexane, and 1,3,5-tribromohexane, and combinations thereof.

7. The method of claim 1, wherein the substituted hydrocarbon is α,ω-dihalogen substituted alkane.

8. The method of claim 1, wherein the 1-oxa-4-azacyclohexane derivative has a structure of:

2-$R_1$-2-$R_2$-3-$R_3$-3-$R_4$-4-$R_9$-5-$R_5$-5-$R_6$-6-$R_7$-6-$R_8$-1-oxa-4-azacyclohexane,    Formula 5:

wherein $R_1$-$R_9$ are independently selected from H or an alkyl group having the formula $C_nH_{2n+1}$ where n is in the range from 1 to 4 and the total number of C atoms in the molecule is in the range of 4 to 10.

9. The method of claim 1, wherein the 1-oxa-4-azacyclohexane derivative is selected from 4-butylmorpholine, 4-propylmorpholine, 4-ethylmorpholine, 4-methylmorpholine, morpholine, 2-methylmorpholine, 2,4-dimethylmorpholine, 4-ethyl-2-methylmorpholine, 4-propyl-2-methylmorpholine, 3-methylmorpholine, 3,4-dimethylmorpholine, 4-ethyl-3-methylmorpholine, 4-propyl-3-methylmorpholine, 5-methylmorpholine, 2,5-dimethylmorpholine, 4-ethyl-5-methylmorpholine, 4-propyl-5-methylmorpholine, 5-ethyl-2-methylmorpholine, 6-methylmorpholine, 4,6-dimethylmorpholine, 4-ethyl-6-methylmorpholine, 4-propyl-6-methylmorpholine, 2,6-dimethylmorpholine, 2,4,6-trimethylmorpholine, 4-ethyl-2,6-dimethylmorpholine, 2,3-dimethylmorpholine, 2,3,4-trimethylmorpholine, 4-ethyl-2,3-dimethylmorpholine, 2,5-dimethylmorpholine, 2,4,5-trimethylmorpholine, 4-ethyl-2,5-dimethylmorpholine, 2,2-dimethylmorpholine, 2,2,4-trimethylmorpholine, 4-ethyl-2,2-dimethylmorpholine, 3,3-dimethylmorpholine, 3,3,4-trimethylmorpholine, 4-ethyl-3,3-dimethylmorpholine, 5,5-dimethylmorpholine, 4,5,5-trimethylmorpholine, 4-ethyl-5,5-dimethylmorpholine, 6,6-dimethylmorpholine, 4,6,6-trimethylmorpholine, 4-ethyl-6,6-dimethylmorpholine, 5-ethyl-2-methylmorpholine and combinations thereof.

10. The method of claim 1, wherein the 1-oxa-4-azacyclohexane derivative is essentially incapable of undergoing pyramidal inversion.

11. The method of claim 1 wherein the organo-1-oxa-4-azoniumcyclohexane compound has a structure of:

2-$R_1$-2-$R_2$-3-$R_3$-3-$R_4$-4-$R_9$-4-$R_{10}$-5-$R_5$-5-$R_6$-6-$R_7$-6-$R_8$-1-oxa-4-azoniumcyclohexane$^+$-$X^-$,    Formula 1:

wherein $R_1$-$R_8$ are independently selected from H or an alkyl group having the formula $C_nH_{2n+1}$ where n is in the range from 1 to 4; $R_9$ and $R_{10}$ form a cyclic alkyl group having the formula $C_mH_{2m}$ forming a heterocycle of ring size q, where m is in the range from 4 to 8, and q is in the range of 5 to m+1; X is a halide or hydroxide; and the total number of C atoms in the molecule is in a range of 8 to 17;

or

[bis-N,N'-di$R_9$-(2,2'-di$R_1$-2,2'-di$R_2$-3,3'-di$R_3$-3,3'-di$R_4$-5,5'-di$R_5$-5,5'-di$R_6$-6,6'-di$R_7$-6,6'-di$R_8$-1,1'-oxa-4,4'-azonium cyclohexane)-$R_{10}$]$^{2+}$2$X^-$,    Formula 2:

wherein $R_1$-$R_9$ are independently selected from H or an alkyl group having the formula $C_nH_{2n+1}$ where n is in the range from 1 to 4, X is halide or hydroxide, the total number of C atoms in the molecule is in the range of 11 to 24, and $R_{10}$ is an alkyl group having the formula $C_mH_{2m}$, where m is in the range from 3 to 8 and is connected to the 4 and 4' N atoms at positions x and y of the alkyl chain where x and y are independently selected from 1 to m;

or

[tris-N,N',N"-tri$R_9$-(2,2',2"-tri$R_1$-2,2',2"-tri$R_2$-3,3',3"-tri$R_3$-3,3',3"-tri$R_4$-5,5',5"-tri$R_5$-5,5',5"-tri$R_6$-6,6',6"-tri$R_7$-6,6',6"-tri$R_8$-1,1',1"-oxa-4,4',4"-azoniumcyclohexane)-$R_{10}$]$^{3+}$3$X^-$,    Formula 3:

wherein $R_1$-$R_9$ are independently selected from H or an alkyl group having the formula $C_nH_{2n+1}$, where n is in the range from 1 to 4, X is halide or hydroxide, the total number of C atoms in the molecule is the range of 15 to 36, and $R_{10}$ is an alkyl group having the formula $C_mH_{2m-1}$, where m is in the range from 3 to 8 and is connected to the 4, 4' and 4" N atoms at positions x, y and z of the alkyl chain where x, y and z are independently selected from 1 to m;

or

2-$R_1$-2-$R_2$-3-$R_3$-3-$R_4$-4-$R_9$-4-$R_{10}$-5-$R_5$-5-$R_6$-6-$R_7$-6-$R_8$-1-oxa-4-azoniumcyclohexane$^+$-$X^-$,    Formula 4:

wherein $R_1$-$R_9$ are independently selected from H or an alkyl group having the formula $C_nH_{2n+1}$, $R_{10}$ is selected from an alkyl group having the formula $C_nH_{2n+1}$ where n is in the range from 1 to 4, benzyl, 1-methylnaphthalene, 2-methylnaphthalene and a non-olefinic alkyl group having the formula $C_pH_{2p-1}$ where p is in the range from 4 to 10, X is halide or hydroxide, and the total number of C atoms in the molecule is in the range of 4 to 16;

or combinations thereof.

12. The method of claim 1 wherein step (d) comprises forming a first mixture of the reactive sources of Al, Si, P and the optional seeds of a crystalline molecular sieve, and adding the solution to the first mixture without cooling the first mixture.

13. The method of claim 1 wherein step (d) comprises forming a reaction mixture of a composition expressed in terms of mole ratios of the oxides of:

$rR:Al_2O_3:eMeO_{j/2}:pP_2O_5:sSiO_2:gH_2O$ where, "r" has a value from about 0.01 to about 10, "e" has a value of 0 to about 1.0, "j" has a value from 2 to 4, "p" has a value of about 0.5 to about 8.0, "s" has a value of 0 to about 1.0, and "g" has a value of about 5 to about 4000.

14. The method of claim 1 wherein the reaction mixture comprises from about 1 to about 10 wt.-% of seed aluminophosphate based on the total mass of oxides in the reaction mixture.

15. An aluminophosphate based molecular sieve prepared by a process comprising:
(a) preparing an aqueous mixture comprising water, a substituted hydrocarbon, and a 1-oxa-4-azacyclohexane derivative wherein said substituted hydrocarbons are selected from the group consisting of halogen substituted alkanes having between 2 and 8 carbon atoms, benzyl halides, 1-halomethane naphthalene, 2-halomethane naphthalene, halo-substituted non-olefinic alkyl groups having the formula $C_pH_{2p-1}$ where p is in the range from 4 to 10, $\alpha,\omega$-dihalogen substituted alkanes having between 3 and 6 carbon atoms, di-halogen substituted alkanes having between 3 and 8 carbon atoms, tri-halogen substituted alkanes having between 3 and 8 carbons, and combinations thereof;
(b) reacting the aqueous mixture;
(c) obtaining a solution comprising an organo-1-oxa-4-azoniumcyclohexane compound;
(d) forming a reaction mixture comprising reactive sources of Al, Me, and P, and the solution wherein Me represents an element selected from the group consistent of Mg, Zn, Be, Ga or an element from the first, second or third transition series of elements; and
(e) heating the reaction mixture to form the molecular sieve.

16. The molecular sieve of claim 15 wherein the organo-1-oxa-4-azoniumcyclohexane compound is a structure directing agent and an organic solvent is not used in obtaining the structure directing agent.

17. The molecular sieve of claim 15 wherein the 1-oxa-4-azacyclohexane derivative is essentially incapable of undergoing pyramidal inversion.

18. The molecular sieve of claim 15 wherein step (d) comprises forming a first mixture of the reactive sources of Al, Si, P and the optional seeds of a crystalline molecular sieve, and adding the solution to the first mixture without cooling the first mixture.

19. The molecular sieve of claim 15 wherein step (d) comprises forming a reaction mixture of a composition expressed in terms of mole ratios of the oxides of:

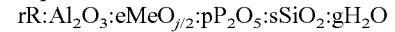

where "r" has a value from about 0.01 to about 10, "e" has a value of 0 to about 1.0, "j" has a value from 2 to 4, "p" has a value of about 0.5 to about 8.0, "s" has a value of 0 to about 1.0, and "g" has a value of about 5 to about 4000.

20. The molecular sieve of claim 15 wherein the reaction mixture comprises from about 1 to about 10 wt.-% of seed aluminophosphate based on the total mass of oxides in the reaction mixture.

* * * * *